US010406473B2

(12) United States Patent
Hatfield et al.

(10) Patent No.: US 10,406,473 B2
(45) Date of Patent: Sep. 10, 2019

(54) EXHAUST UNIT

(71) Applicants: Toyota Motor Engineering & Manufacturing North America, Inc., Erlanger, KY (US); Air Separation Technologies Inc., Milton (CA)

(72) Inventors: Bradley Hatfield, Lawrenceburg, KY (US); Christopher S. Tiede, Lexington, KY (US); Donald V. Fagin, Milton (CA)

(73) Assignees: Toyota Motor Engineering & Manufacturing North America, Inc., Plano, TX (US); Air Separation Technologies Inc., Ontario (CA)

( * ) Notice: Subject to any disclaimer, the term of this patent is extended or adjusted under 35 U.S.C. 154(b) by 279 days.

(21) Appl. No.: 15/170,234

(22) Filed: Jun. 1, 2016

(65) Prior Publication Data

US 2017/0348628 A1    Dec. 7, 2017

(51) Int. Cl.
| | |
|---|---|
| *B01D 47/00* | (2006.01) |
| *B01D 53/14* | (2006.01) |
| *B01D 50/00* | (2006.01) |
| *B01D 47/02* | (2006.01) |
| *B01D 46/00* | (2006.01) |
| *B01D 46/46* | (2006.01) |
| *B01D 46/44* | (2006.01) |
| *B01D 45/06* | (2006.01) |

(52) U.S. Cl.
CPC ......... *B01D 50/006* (2013.01); *B01D 45/06* (2013.01); *B01D 46/0035* (2013.01); *B01D 46/444* (2013.01); *B01D 46/46* (2013.01); *B01D 47/024* (2013.01)

(58) Field of Classification Search
None
See application file for complete search history.

(56) References Cited

U.S. PATENT DOCUMENTS

| | | | | |
|---|---|---|---|---|
| 4,005,999 | A * | 2/1977 | Carlson | B01D 47/024 261/119.1 |
| 4,287,405 | A | 9/1981 | Ohmae et al. | |
| 4,778,483 | A * | 10/1988 | Martin | B01D 47/024 48/69 |
| 5,520,714 | A * | 5/1996 | Muschelknautz | F23G 5/50 261/123 |
| 5,807,414 | A | 9/1998 | Schaefer | |
| 5,871,562 | A * | 2/1999 | Culoso | A61L 9/122 95/256 |
| 6,391,100 | B1 * | 5/2002 | Hogan | B01D 45/12 261/DIG. 54 |

(Continued)

*Primary Examiner* — Amber R Orlando
*Assistant Examiner* — Phillip Y Shao
(74) *Attorney, Agent, or Firm* — Christopher G. Darrow; Darrow Mustafa P.C.

(57) ABSTRACT

An exhaust unit includes a dirty air intake opening, a clean air output opening and an airflow path defined between the dirty air intake opening and the clean air output opening. The exhaust unit further includes an upstream quenching section and a downstream filtering section along the airflow path. The quenching section has a wetting chamber that includes a reservoir having a fill level for a quenching liquid, and a downtube connected over the dirty air intake opening and opening at its end above, and in opposition to, the plane of the fill level.

13 Claims, 3 Drawing Sheets

(56) References Cited

U.S. PATENT DOCUMENTS

| | | | |
|---|---|---|---|
| 6,521,027 B1* | 2/2003 | Wang | B01D 47/06 96/240 |
| 6,626,983 B1* | 9/2003 | Cairns | F01N 3/04 95/226 |
| 6,758,875 B2 | 7/2004 | Reid et al. | |
| 7,033,547 B1* | 4/2006 | Ichikawa | B01D 53/56 422/168 |
| 2007/0181638 A1* | 8/2007 | Sueyasu | B01D 47/06 228/101 |
| 2008/0257163 A1* | 10/2008 | Kobayashi | B01D 45/16 96/376 |
| 2014/0366721 A1 | 12/2014 | Roy | |
| 2015/0004064 A1* | 1/2015 | Lee | B01D 50/006 422/121 |

* cited by examiner

EXHAUST UNIT

TECHNICAL FIELD

The embodiments disclosed herein generally relate to exhaust units used to filter dirty air.

BACKGROUND

Many assembly plants and other industrial environments have exhaust systems employed to remove so-called dirty air from an area. The exhaust system may include an exhaust unit that is configured to intake the dirty air, remove its airborne particulates and swept up particles with air filters, and output the resulting so-called clean air. The exhaust system may return the clean air to the area, exhaust the clean air outside, or return some of the clean air to the area while exhausting the remainder of the clean air outside.

SUMMARY

Disclosed herein are embodiments of exhaust units. In one aspect, an exhaust unit includes a dirty air intake opening, a clean air output opening and an airflow path defined between the dirty air intake opening and the clean air output opening. The exhaust unit further includes an upstream quenching section and a downstream filtering section along the airflow path. The quenching section has a wetting chamber that includes a reservoir having a fill level for a quenching liquid, and a downtube connected over the dirty air intake opening and opening at its end above, and in opposition to, the plane of the fill level.

In another aspect, an exhaust unit includes a wetting chamber, a dirty air chamber and a clean air chamber. The wetting chamber opens to a dirty air intake opening, and includes a reservoir having a fill level for a quenching liquid, a downtube connected over the dirty air intake opening and opening at its end above, and in opposition to, the plane of the fill level, and upright perimeter walls surrounding the downtube. The dirty air chamber opens from the wetting chamber through an opening defined at the top of one of the wetting chamber's perimeter walls, and includes one or more air filters. The clean air chamber opens from the dirty air chamber through one or more openings over which the air filters are supported, and opens to a clean air output opening.

These and other aspects will be described in additional detail below.

BRIEF DESCRIPTION OF THE DRAWINGS

The various features, advantages and other uses of the present embodiments will become more apparent by referring to the following detailed description and drawing in which.

DETAILED DESCRIPTION

This disclosure teaches an exhaust unit that is configured to intake dirty air containing airborne particulates and swept up particles, remove the dirty air's airborne particulates and swept up particles, and output the resulting clean air. The exhaust unit wets the swept up particles in an upstream quenching section. In a downstream filtering section, the exhaust unit removes the airborne particulates and any wetted swept up particles with one or more air filters. If the swept up particles are sparks, the sparks are quenched when wetted in the quenching section. The quenched sparks therefore do not pose the otherwise present threat of igniting the air filters in the filtering section.

Figure 1:
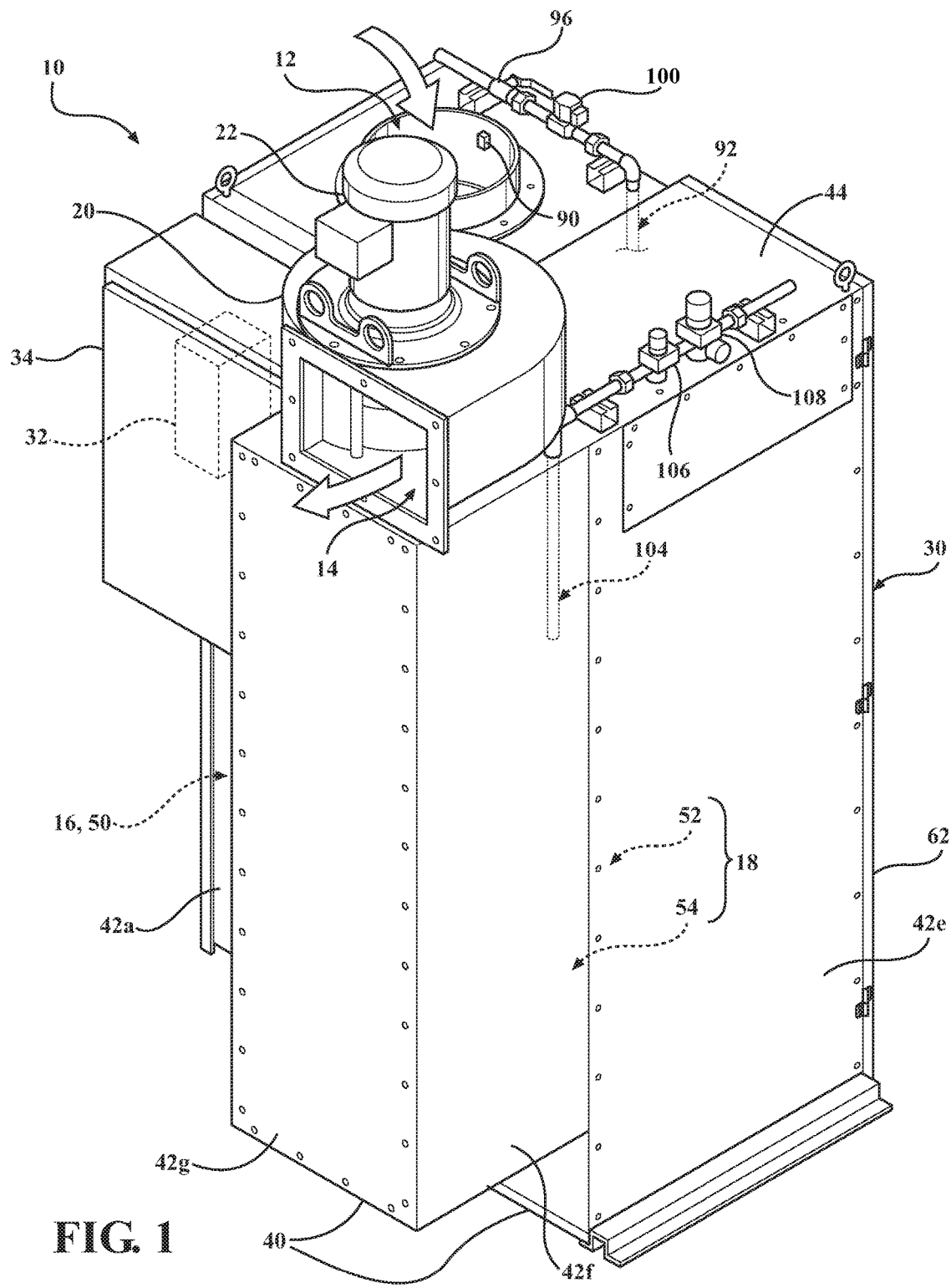
FIG. 1 is a perspective view of an exhaust unit with an airflow path defined between a dirty air intake opening and a clean air output opening, and an upstream quenching section and a downstream filtering section along its airflow path.
Figure 2:
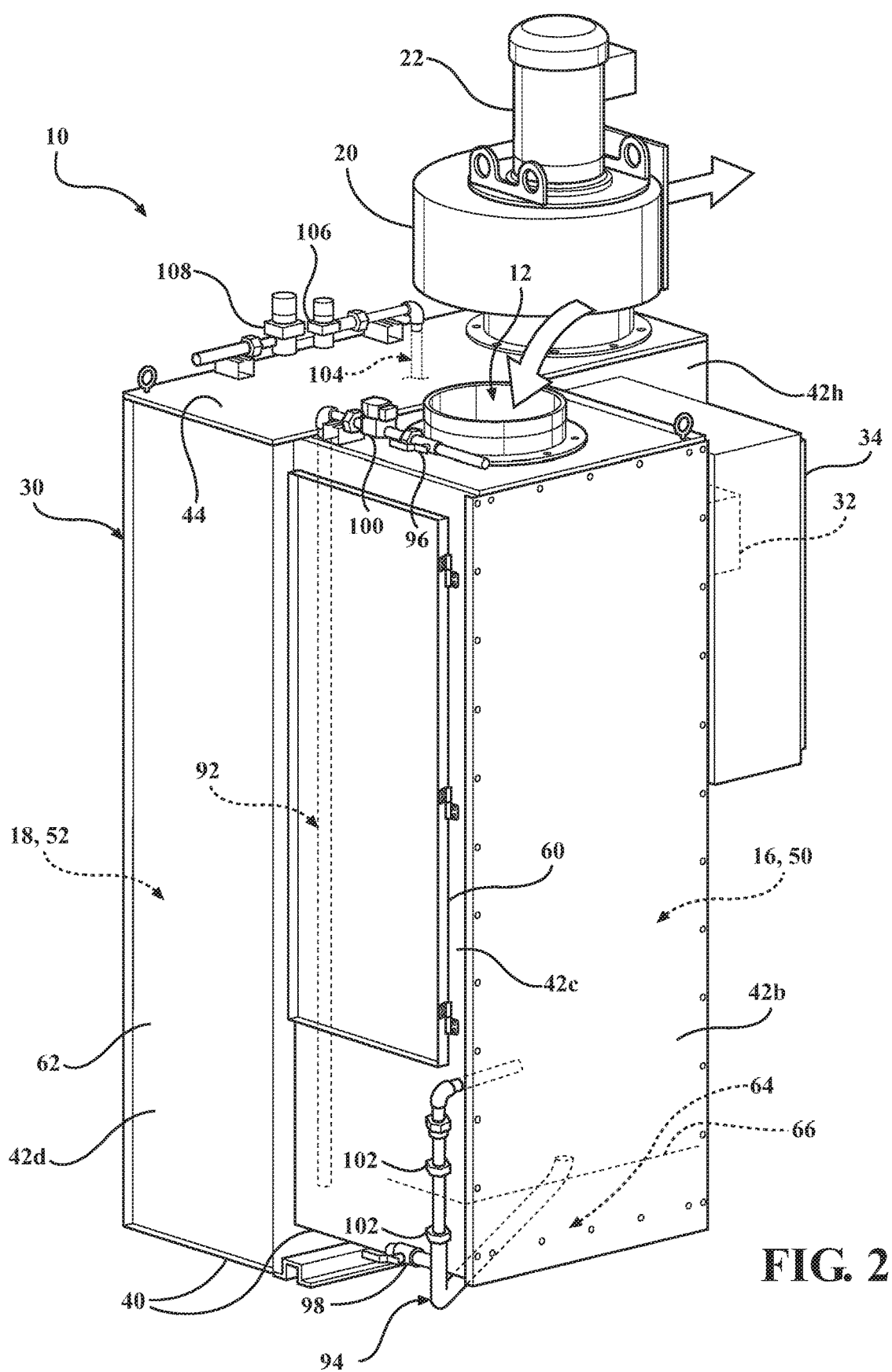
FIG. 2 is an alternate perspective view of the exhaust unit.

An exhaust unit 10 is shown in FIGS. 1 and 2. The exhaust unit 10 defines an interior airflow path between an exterior dirty air intake opening 12 and an exterior clean air output opening 14. The exhaust unit 10, along its airflow path, includes an upstream quenching section 16 and a downstream filtering section 18. In operation, airflow is induced along the airflow path. More specifically, airflow is induced into the dirty air intake opening 12, through the quenching section 16 and the filtering section 18, and out the clean air output opening 14.

Dirty air flows in the dirty air intake opening 12. The dirty air may contain airborne particulates. The airborne particulates may be suspended particles of any kind of solid or liquid matter. The dirty air may further contain particles of any kind of solid or liquid matter that are swept up as a product of the induced airflow into the dirty air intake opening 12, but which are too large to otherwise become suspended.

The airborne particulates and swept up particles contained in the dirty air may be the byproducts of a process performed, for instance, in an area of an assembly plant or other industrial environment. The airborne particulates and swept up particles may, for example, be the byproducts of a welding process performed in the area. In cases including but not limited to a welding process, the airborne particulates may be or include fumes, and the swept up particles may be or include sparks.

The dirty air took in at the dirty air intake opening 12 flows along the airflow path through the quenching section 16. In the quenching section 16, the dirty air's swept up particles are wetted. If the swept up particles are sparks, the sparks are quenched when wetted in the quenching section 16. The dirty air continues to flow along the airflow path through the filtering section 18. In the filtering section 18, the airborne particulates and any wetted swept up particles are removed from the dirty air. The resulting clean air then flows out the clean air output opening 14.

The exhaust unit 10 may be a standalone unit including one or more blowers 20 that, in operation, induce airflow along the airflow path. A blower 20 may be included at any location along the airflow path. As shown, a blower 20 is included at a downstream end of the airflow path to pull air along the airflow path. Alternatively, or additionally, a blower 20 may be included at an upstream end of the airflow path to push air along the airflow path, for example. Regardless of the location where a blower 20 is included along the airflow path, the blower 20 may be a centrifugal fan, for example. In this or other examples of a blower 20, the blower 20 may be connected to a motor 22 that, in operation, powers the blower 20 for operation to induce airflow along the airflow path.

The exhaust unit 10 may be employed locally in an area with dirty air. The area may be open, fully enclosed or partially enclosed. The area may be an area where a process is performed whose byproducts are contained in the dirty air. The area, for example, may be an enclosed weld cell where a welding process is performed whose fumes, sparks and other byproducts, if any, are contained in the dirty air.

If the exhaust unit 10 is employed locally in an area with dirty air, the dirty air intake opening 12 may open from the remainder of the exhaust unit 10. With this configuration, when airflow is induced along the airflow path, the area's dirty air is removed from the area as it flows in the dirty air intake opening 12. Similarly, the clean air output opening 14 may open from the remainder of the exhaust unit 10. With this configuration, when airflow is induced along the airflow path, the resulting clean air is returned to the area as it flows out the clean air output opening 14.

The exhaust unit 10 may also be part of a larger exhaust system. As described above, the exhaust unit 10 may include one or more blowers 20 that, in operation, induce airflow along the airflow path. If the exhaust unit 10 is a part of a larger exhaust system, the one or more blowers 20 may also, in operation, induce airflow elsewhere in the exhaust system. Alternatively, or additionally, the exhaust system may include one or more blowers that, in operation, induce airflow either along the airflow path or elsewhere in the exhaust system, or both.

If the exhaust unit 10 is part of a larger exhaust system, the exhaust system may include exterior upstream ductwork that opens to one or more areas with dirty air and connects to the exhaust unit 10 over its dirty air intake opening 12. With this configuration, when airflow is induced through the upstream ductwork and along the airflow path, dirty air is removed from the one or more areas and delivered to the exhaust unit 10 at its dirty air intake opening 12. The exhaust system may include exterior downstream ductwork that connects to the exhaust unit 10 over its clean air output opening 14. The downstream ductwork may open to the one or more areas with dirty air in a configuration where, when airflow is induced along the airflow path and through the downstream ductwork, clean air is returned to those areas. Alternatively, or additionally, the downstream ductwork may open to the outside in a configuration where, when airflow is induced along the airflow path and through the downstream ductwork, clean air is exhausted outside.

The exhaust unit 10 has a housing 30. The housing 30 forms the exterior of the exhaust unit 10 and contains its airflow path. As described below, the housing 30 further houses interior structures that implement the functions of the quenching section 16 and the filtering section 18. As further described below, the housing 30 also bears a number of systems that support the operation of the exhaust unit 10. These systems may support the overall operation the exhaust unit 10, as well as the operations of the quenching section 16 and the filtering section 18 specifically.

The systems that support the operation the exhaust unit 10 may be implemented in part by a computing device 32. The computing device 32 may be included in the exhaust unit 10. As shown, the computing device 32 may be housed in a control panel 34 mounted to the housing 30. Alternatively, the computing device 32 may be included remotely from the exhaust unit 10. Although the computing device 32 may be dedicated to the exhaust unit 10, it is contemplated that computing device 32 may also support the operation of a larger exhaust system that the exhaust unit 10 is a part of.

The computing device 32 includes a processor communicatively coupled with a memory. The processor may include any device capable of executing machine-readable instructions, which may be stored on a non-transitory computer-readable medium, for example the memory. The processor may include a controller, an integrated circuit, a microchip, a computer, and/or any other computing device.

The various algorithms and data for the systems that support the operation the exhaust unit 10 reside in whole or in part in the memory. The memory may include any type of computer readable medium suitable for storing data and algorithms. For example, the memory may include RAM, ROM, a flash memory, a hard drive, and/or any device capable of storing machine-readable instructions.

The computing device 32 may also include an input/output interface for facilitating communication between the processor and other components. Although the computing device 32 is shown for simplicity as being a single unit, in practice the computing device 32 may be a plurality of units, each having one or more memories and/or processors that may be communicatively coupled with one or more components.

The housing 30 is constructed from a combination of interconnected frame members, panels and other components. The components of the housing 30 may be interconnected with fasteners, adhesives or any combination of these. The components of the housing 30 may be made from sheet metal or any other suitable material or combination of materials.

Figure 3:
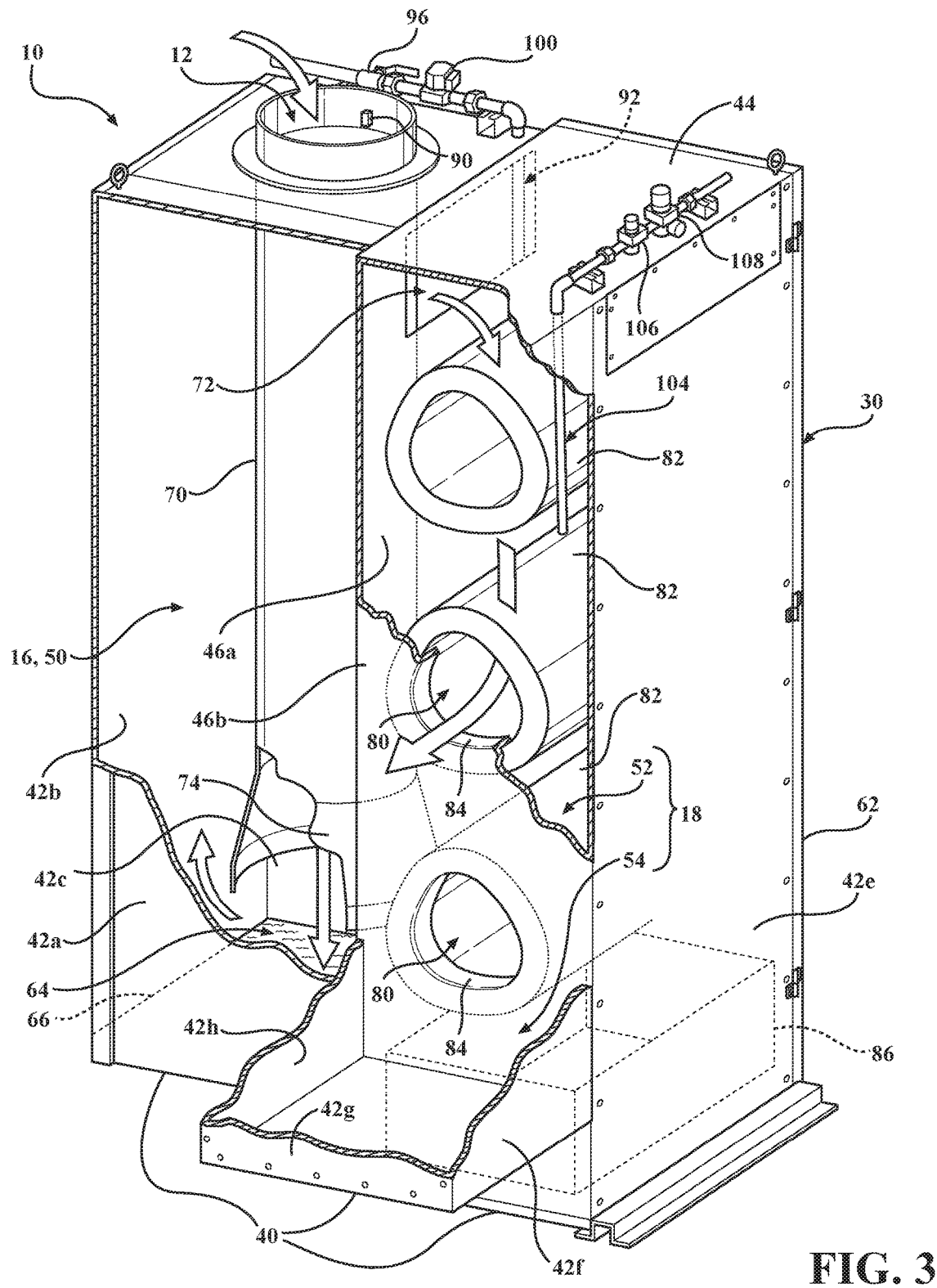
FIG. 3 is a partially cut away perspective view of the exhaust unit, showing the airflow path and features of the quenching section and the filtering section.

The housing 30 is a generally enclosed structure with a base 40, upright exterior walls 42a-h and a roof 44. As shown with additional reference to FIG. 3, the housing 30 has upright interior walls 46a and 46b dividing the space between the base 40, the exterior walls 42a-h and the roof 44 into a number of interior chambers, through which the airflow path is successively defined. The interior chambers include a wetting chamber 50 in the quenching section 16, and a dirty air chamber 52 and a clean air chamber 54 in the filtering section 18.

The exterior walls 42a-h may include access panels over the interior chambers. As shown, an access panel 60 is included over the wetting chamber 50. The access panel 60 may be connected to the remainder of the housing 30 for movement between a closed position and an open position permissive of access to the wetting chamber 50, for example. Another access panel 62 is included over the dirty air chamber 52. The access panel 62 may similarly be connected to the remainder of the housing 30 for movement between a closed position and an open position permissive of access to the dirty air chamber 52, for example. Alternatively, or additionally, other parts of the housing 30 may include access panels over the interior chambers.

The wetting chamber 50 is generally enclosed. The perimeter of the wetting chamber 50 is defined by adjacent exterior walls 42a-c and the interior wall 46a. The interior wall 46a extends between the adjacent exterior walls 42a-c and is shared with the dirty air chamber 52. The remainder of the wetting chamber 50 is defined by a portion of the base 40 and a portion of the roof 44.

The wetting chamber 50 includes an internal reservoir 64 for holding a quenching liquid. The quenching liquid may be water, for example. The reservoir 64 may be any structure that has the requisite bottom and upright perimeter walls for holding the quenching liquid, but which is otherwise open to the remainder of the wetting chamber 50 to expose the surface of the quenching liquid. The reservoir 64 may be included at the bottom of the wetting chamber 50. The reservoir 64 may be or include the bottom of the wetting chamber 50, for example. With this configuration, the reservoir 64 may be or include the bottom portions of the same adjacent exterior walls 42a-c and the interior wall 46a that define the perimeter of the wetting chamber 50, and the same portion of the base 40 that partly defines the remainder of the wetting chamber 50.

The reservoir 64 may have a fill level 66 for the quenching liquid. In general, the fill level 66 indicates the level at which the quenching liquid should be maintained. If the reservoir 64 includes the bottom portions of the same adjacent exterior walls 42a-c and the interior wall 46a that define the perimeter of the wetting chamber 50, the fill level 66 may be defined horizontally either along those adjacent exterior walls 42a-c or along the interior wall 46a, or both.

The dirty air intake opening 12 opens from the exterior of the housing 30 to the wetting chamber 50. The dirty air intake opening 12 may open from the same portion of the roof 44 that partly defines the wetting chamber 50, for example. If the exhaust unit 10 is employed locally in an area with dirty air, the exhaust unit 10 may include exterior upstream ductwork that opens to the proximity of a process whose byproducts are contained in the dirty air and connects to the exhaust unit 10 over its dirty air intake opening 12.

In addition to the reservoir 64, the wetting chamber 50 includes an internal downtube 70. The downtube 70 connects to the housing 30 over the dirty air intake opening 12 and opens at its end above, and in opposition to, the plane of the fill level 66. Accordingly, if the quenching liquid is maintained at the fill level 66, the downtube 70 opens at its end above, and in opposition to, the surface of the quenching liquid held by the reservoir 64.

The outside of the downtube 70 may be surrounded in whole or in part by one, some or all of the adjacent exterior walls 42a-c and the interior wall 46a that define the perimeter of the wetting chamber 50. As shown, the downtube 70 is located centrally in the wetting chamber 50, and the outside of the downtube 70 is wholly surrounded by the adjacent exterior walls 42a-c and the interior wall 46a that define the perimeter of the wetting chamber 50.

The wetting chamber 50 culminates the quenching section 16, and opens to the dirty air chamber 52 included in the filtering section 18 through an opening 72 between the wetting chamber 50 and the dirty air chamber 52. The opening 72 may be defined by the interior wall 46a shared with the dirty air chamber 52, for example. The opening 72 may, as shown, be defined at the top of the interior wall 46a shared with the dirty air chamber 52, for example.

The airflow path is initially defined from the exterior dirty air intake opening 12, through the inside of the downtube 70 and to the end of the downtube 70. The airflow path is further defined between the outside of the downtube 70 and the adjacent exterior walls 42a-c and the interior wall 46a that define the perimeter of the wetting chamber 50.

When airflow is induced along the airflow path, dirty air flows in the dirty air intake opening 12 and through the inside of the downtube 70. As it flows out the end of the downtube 70, the dirty air is directed at the surface of the quenching liquid. When the dirty air hits the surface of the quenching liquid, it is redirected away from the surface of the quenching liquid and between the outside of the downtube 70 and the adjacent exterior walls 42a-c and the interior wall 46a that define the perimeter of the wetting chamber 50.

If the dirty air contains swept up particles, one, some or all of the swept up particles may fall from the dirty air and land in the quenching liquid. If the swept up particles are sparks, the sparks are wetted by the quenching liquid and quenched.

If the swept up particles are sparks, the energy carried by the sparks may be correlated to their weight, with increasingly heavy sparks carrying increasingly more energy. For some lower weight sparks, it may not be necessary to wet the sparks with the quenching liquid in order to quench them. Instead, these sparks may be quenched as a product of being swept up with the dirty air and contained in the dirty air as it flows along the airflow path through the quenching section 16. However for some higher weight sparks, it may be necessary to wet the sparks with the quenching liquid in order to quench them despite them being swept up with the dirty air and contained in the dirty air as it flows along the airflow path through the quenching section 16.

In general, whether swept up particles fall from the dirty air and land in the quenching liquid is a product of both their weight and the dirty air's velocity as it flows out the end of the downtube 70 and is directed at the surface of the quenching liquid. Specifically, swept up particles are increasingly more likely to fall from the dirty air and land in the quenching liquid with increasing weight. Moreover, swept up particles are increasingly more likely to fall from the dirty air and land in the quenching liquid with the dirty air's decreasing velocity as it flows out the end of the downtube 70 and is directed at the surface of the quenching liquid.

The cross section of the inside of the downtube 70 at its end may be sized to promote the maintenance of the dirty air's velocity as it flows out the end of the downtube 70 and is directed at the surface of the quenching liquid at a setpoint velocity. The setpoint velocity may be the velocity where higher weight swept up particles that, if they are sparks, must be wetted by the quenching liquid in order to quench them, fall from the dirty air and land in the quenching liquid.

In the remainder of the downtube 70, the cross section of the inside of the downtube 70 may be sized to promote the dirty air's relatively higher velocity as it flows elsewhere through the inside of the downtube 70. The relatively higher velocity may ensure that lower weight swept up particles that do not ultimately fall from the dirty air and land in the quenching liquid are nonetheless, if they are sparks, quenched as a product of being swept up with the dirty air and contained in the dirty air as it flows through the inside of the remainder of the downtube 70.

Accordingly, the downtube 70 may have a section 74 leading to its end where the cross section of the inside of the downtube 70 is expanded compared to the cross section of the inside of the remainder of downtube 70 leading from where the downtube 70 connects over the dirty air intake opening 12. This promotes the maintenance of the dirty air's velocity at the setpoint velocity as it flows out the end of the downtube 70 and is directed at the surface of the quenching liquid, while promoting the dirty air's relatively higher velocity as it flows in the dirty air intake opening 12 and through the inside of the remainder of the downtube 70. As shown, the section 74 may be a flared section where the cross section of the inside of the downtube 70 progressively expands, for example. Alternatively, the cross section of the inside of the downtube 70 may expand stepwise in the section 74 in one or more steps, for example.

The airflow path is further defined through the opening 72 between the wetting chamber 50 and the dirty air chamber 52. The dirty air chamber 52 is generally enclosed. The perimeter of the dirty air chamber 52 is defined by adjacent exterior walls 42d and 42e, the interior wall 46a shared with the wetting chamber 50 and the interior wall 46b. The interior wall 46b extends between the adjacent exterior walls 42d and 42e and the interior wall 46a shared with the wetting chamber 50, and is shared with the clean air chamber 54. The remainder of the dirty air chamber 52 is defined by a portion of the base 40 and a portion of the roof 44.

In the filtering section 18, the dirty air chamber 52 opens to the clean air chamber 54 through openings 80 between the dirty air chamber 52 and the clean air chamber 54. The openings 80 may, as shown, be defined by the interior wall 46b shared with the clean air chamber 54, for example.

The dirty air chamber 52 includes one or more air filters 82. The air filters 82 are supported in the dirty air chamber 52 over the openings 80 between the dirty air chamber 52 and the clean air chamber 54. As shown, there may be multiple openings 80 between the dirty air chamber 52 and the clean air chamber 54, and the dirty air chamber 52 may include one air filter 82 supported over each of the openings 80. The air filters 82 may be accessed for servicing or replacement via the access panel 62 included in the exterior wall 42d over the dirty air chamber 52.

The air filters 82 may each be generally tubular. At one end, the inside of each of the air filters 82 may be fitted over an annular lip 84 that extends into the dirty air chamber 52 from the interior wall 46b shared with the clean air chamber 54. Each annular lip 84 may border a corresponding opening 80 between the dirty air chamber 52 and the clean air chamber 54. With this configuration, by the fitment of the inside of each of the air filters 82 over a respective annular lip 84, each of the air filters 82 is supported over a respective corresponding opening 80 between the dirty air chamber 52 and the clean air chamber 54. At the other end, each of the air filters 82 may be similarly or otherwise supported at the exterior wall 42d.

The dirty air chamber 52 may further include a collector 86. The collector 86 is supported beneath the air filters 82 for collecting swept up particles falling from either the dirty air or the air filters 82, or both. The collector 86 may be supported beneath the air filters 82 on the same portion of the base 40 that partly defines the dirty air chamber 52. The collector 86 may be accessed for emptying via the access panel 62 included in the exterior wall 42d over the dirty air chamber 52.

The airflow path is further defined between the adjacent exterior walls 42d and 42e and the interior walls 42a and 42b that define the perimeter of the dirty air chamber 52, and through the air filters 82.

When airflow is induced along the airflow path, dirty air flows through the air filters 82. The air filters 82 may be particulate filters for removing airborne particulates contained in the dirty air. The air filters 82 may further remove swept up particles contained in the dirty air. The swept up particles may include un-wetted swept up particles. The swept up particles may further include any wetted swept up particles remaining in the dirty air after falling from the dirty air and landing in the quenching liquid. If the un-wetted swept up particles were sparks, the sparks will have been quenched as a product of being swept up with the dirty air and contained in the dirty air as it flows along the airflow path through the quenching section 16. If the wetted swept up particles were sparks, the sparks will have been quenched when wetted. In either case, the quenched sparks do not pose the otherwise present threat of igniting the air filters 82.

The airflow path is further defined through the openings 80 between the dirty air chamber 52 and the clean air chamber 54 over which the air filters 82 are supported. The clean air chamber 54 is generally enclosed. The perimeter of the clean air chamber 54 is defined by adjacent exterior walls 42f-h and the interior wall 46b shared with the dirty air chamber 52. The remainder of the clean air chamber 54 is defined by a portion of the base 40 and a portion of the roof 44. The clean air chamber 54 equalizes the loading on each of the air filters 82.

The clean air chamber 54 culminates the filtering section 18, and opens to the blower 20. The clean air chamber 54 may to the same portion of the roof 44 that partly defines the clean air chamber 54, for example. The blower 20 is connected to the exterior of the housing 30 over that portion of the roof 44, and the clean air output opening 14 opens from the blower 20. With this configuration, the blower 20 is included at a downstream end of the airflow path and, in operation, pulls air along the airflow path. The blower 20 is connected to the motor 22 that, in operation, powers the blower 20 for operation.

The airflow path is finally defined between the adjacent exterior walls 42f-h and the interior wall 46b that define the perimeter of the clean air chamber 54, through the blower 20 and to the clean air output opening 14. When airflow is induced along the airflow path, the clean air resulting from the removal, by the air filters 82, of airborne particulates and swept up particles contained in the dirty air flows out the clean air output opening 14. If the exhaust unit 10 is employed locally in an area with dirty air, the exhaust unit 10 may include exterior downstream ductwork that connects to the exhaust unit 10 over its clean air output opening 14 and to a desirable place in the area for the clean air to be returned.

The exhaust unit 10 may have an airflow control system for managing the airflow along the airflow path. The airflow control system may include the motor 22 that powers the blower 20, one or more air sensors 90 and the computing device 32. The motor 22 and the air sensors 90 may be communicatively connected to the computing device 32 through one or more wired or wireless communication links.

Each air sensor 90 may be included at any location along the airflow path. Alternatively, or additionally, if the exhaust unit 10 is part of a larger exhaust system, the air sensors 90 may be located in exterior upstream ductwork that connects to the exhaust unit 10 over its dirty air intake opening 12, or in exterior downstream ductwork that connects to the exhaust unit 10 over its clean air output opening 14.

The air sensors 90 may generate signals responsive to local airflow. The signals generated by the air sensors 90 may indicate one or more dynamic properties of the air. The dynamic properties of the air may include its velocity, pressure or volumetric flow rate, for example. The signals generated by the air sensors 90 may directly indicate one or more dynamic properties of the air, and indirectly indicate one or more other dynamic properties of the air based on known relationships about airflow.

If the air sensors 90 are included at a given location along the airflow path, the signals generated by the air sensors 90 may directly indicate the dynamic properties of the air at that location. The signals generated by the air sensors 90 may indirectly indicate the dynamic properties of the air at other locations along the airflow path based on known relationships about the structure defining the airflow path. If the air sensors 90 are included in upstream ductwork that connects to the exhaust unit 10 over its dirty air intake opening 12, the signals generated by the air sensors 90 may indirectly indicate the dynamic properties of the air at locations along the airflow path based on known relationships about the upstream ductwork and the structure defining the airflow path. Similarly, if the air sensors 90 are included in downstream ductwork that connects to the exhaust unit 10 over its clean air output opening 14, the signals generated by the air sensors 90 may indirectly indicate the dynamic properties of the air at locations along the airflow path based on known relationships about the downstream ductwork and the structure defining the airflow path.

The signals generated by the air sensors 90 may indicate the dirty air's velocity as it flows out the end of the downtube 70 and is directed at the surface of the quenching liquid.

Further, the operating speed of the motor 22 may be subject to control by the computing device 32. The computing device 32 may have a module residing in memory that controls the operating speed of the motor 22 in response to these signals to maintain the dirty air's velocity as it flows out the end of the downtube 70 and is directed at the surface of the quenching liquid at the setpoint velocity.

In one implementation, the air sensors 90 may be or include a pressure sensor included at or near the dirty air intake opening 12, for example. With this configuration, the signals generated by the air sensors 90 may indirectly indicate the dirty air's velocity as it flows out the end of the downtube 70 and is directed at the surface of the quenching liquid based on known relationships about airflow and known relationships about the downtube 70 and the remaining structure defining the airflow path.

The exhaust unit 10 may have a fill system for maintaining the quenching liquid held by the reservoir 64 at the fill level 66.

The fill system may include a fill line 92. The fill line 92 may connect to a quenching liquid source and open to the wetting chamber 50 in communication with the reservoir 64. If the quenching liquid is water, the fill line 92 may connect to a water source. With this configuration, quenching liquid may be added to the reservoir 64 by opening the fill line 92. The fill system may further include a drain line 94. The drain line 94 may open to the bottom of the reservoir 64. With this configuration, quenching liquid may be removed from the reservoir 64 by opening the drain line 94.

One or more ball valves 96 may be included on the fill line 92. The ball valves 96 may be selectively manually actuable to open or close. Absent other components closing the fill line 92, the fill line 92 may be opened by manually opening the ball valves 96. Conversely, the fill line 92 may be closed by manually closing any of the ball valves 96. One or more ball valves 98 may similarly be included on the drain line 94. The ball valves 98 may be selectively manually actuable to open or close. Absent other components closing the drain line 94, the drain line 94 may be opened by manually opening the ball valves 98. Conversely, the drain line 94 may be closed by manually closing any of the ball valves 98.

The fill system may further include a fill valve 100 included on the fill line 92, one or more fill level sensors 102 and the computing device 32. The fill valve 100 and the fill level sensors 102 may be communicatively connected to the computing device 32 through one or more wired or wireless communication links.

The fill valve 100 may be selectively actuable to open or close. Absent other components closing the fill line 92, the fill line 92 may be opened by opening the fill valve 100. Conversely, the fill line 92 may be closed by closing the fill valve 100.

Each fill level sensor 102 may generate signals responsive to the level of the quenching liquid held by the reservoir 64. The signals generated by the fill level sensors 102 may indicate the level of the quenching liquid held by the reservoir 64.

The signals generated by the fill level sensors 102 may indicate whether the level of the quenching liquid held by the reservoir 64 reaches the plane of the fill level 66. Further, the actuation of the fill valve 100 may be subject to control by the computing device 32. The computing device 32 may have a module residing in memory that controls the actuation of the fill valve 100 in response to these signals to maintain the level of the quenching liquid held by the reservoir 64 at the fill level 66. More specifically, the module may open the fill valve 100 and, in turn, open the fill line 92, if the signals generated by the fill level sensors 102 indicate that the level of the quenching liquid held by the reservoir 64 does not reach the plane of the fill level 66. On the other hand, the module may close the fill valve 100 and, in turn, close the fill line 92, if the signals generated by the fill level sensors 102 indicate that the level of the quenching liquid held by the reservoir 64 does reach the plane of the fill level 66.

The signals generated by the fill level sensors 102 may further indicate whether the level of the quenching liquid held by the reservoir 64 reaches above the plane of the fill level 66. The computing device 32 may have a module residing in memory that initiates an alarm if the signals generated by the fill level sensors 102 indicate that the level of the quenching liquid held by the reservoir 64 is above the plane of the fill level 66.

In one implementation, in addition to opening to the bottom of the reservoir 64, the drain line 94 may open in the wetting chamber 50 above the surface of the quenching liquid held by the reservoir 64. With this configuration, the level of the quenching liquid held by the drain line 94 will match the level of the quenching liquid held by the reservoir 64.

The fill level sensors 102 may include an operating fill level sensor 102 located on the drain line 94 in the plane of the fill level 66. The signals generated by the operating fill level sensor 102 may indicate whether the level of the quenching liquid held by the drain line 94 reaches the plane of the fill level 66. By extension, the signals generated by the operating fill level sensor 102 may indicate whether the level of the quenching liquid held by the reservoir 64 reaches the plane of the fill level 66. The fill level sensors 102 may further include a high fill level sensor 102 located on the drain line 94 above the plane of the fill level 66. The signals generated by the high fill level sensor 102 may indicate whether the level of the quenching liquid held by the drain line 94 reaches above the plane of the fill level 66. By extension, the signals generated by the high fill level sensor 102 may indicate whether the level of the quenching liquid held by the reservoir 64 reaches above the plane of the fill level 66.

The exhaust unit 10 may have a blowdown system for expelling swept up particles accumulated on the air filters 82 upon their removal from the dirty air. The blowdown system may include a compressed air line 104, an air valve 106 and a pressure relief valve 108 included on the compressed air line 104, and the computing device 32. The air valve 106 may be communicatively connected to the computing device 32 through one or more wired or wireless communication links.

The compressed air line 104 may open to the clean air chamber 54 and connect to a compressed air source. With this configuration, compressed air may be added to the clean air chamber 54 by opening the compressed air line 104.

The air valve 106 may be selectively actuable to open or close. Absent other components closing the compressed air line 104, the compressed air line 104 may be opened by opening the air valve 106. Conversely, the compressed air line 104 may be closed by closing the air valve 106. The pressure relief valve 108 may be actuable to open to ambient in response to the air pressure in the compressed air line 104. If the pressure in the compressed air line 104 is too high, the pressure relief valve 108 may open to ambient to relieve the pressure in the compressed air line 104.

The actuation of the air valve 106 may be subject to control by the computing device 32. The computing device 32 may have a module residing in memory that controls the actuation of the air valve 106 to expel swept up particles accumulated on the air filters 82 upon their removal from the dirty air. More specifically, the module may open the air valve 106 and, in turn, open the compressed air line 104, at times where the blower 20 is not powered for operation to induce airflow along the airflow path. When compressed air is added to the clean air chamber 54, airflow is induced backwards along the airflow path. Some of this airflow is induced backwards through the openings 80 between the dirty air chamber 52 and the clean air chamber 54 over which the air filters 82 are supported, and backwards through the air filters 82, which expels swept up particles accumulated on the air filters 82. At times where the blower 20 is powered for operation to induce airflow along the airflow path, the module may close the air valve 106 and, in turn, close the compressed air line 104.

While recited characteristics and conditions of the invention have been described in connection with certain embodiments, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. An exhaust unit, comprising:
 a dirty air intake opening;
 a clean air output opening;
 an airflow path defined between the dirty air intake opening and the clean air output opening;
 an upstream quenching section along the airflow path, the quenching section having a wetting chamber, the wetting chamber including a reservoir having a fill level for a quenching liquid, and a downtube connected over the dirty air intake opening and opening at its end above, and in opposition to, the plane of the fill level;
 a downstream filtering section along the airflow path;
 a blower operable to induce airflow along the airflow path;
 a motor operable to power the blower;
 an air sensor located along the airflow path and configured to generate signals indicating, when the reservoir holds a quenching liquid at the fill level, the air's velocity as it flows out the end of the downtube and is directed at the surface of the quenching liquid; and
 a computing device in communication with the motor and the air sensor, the computing device configured to control the operating speed of the motor in response to the signals to maintain the air's velocity as it flows out the end of the downtube and is directed at the surface of the quenching liquid at a setpoint velocity, wherein the setpoint velocity is a velocity where, if the air is dirty air containing swept up particles, at least some of the swept up particles fall from the dirty air and land in the quenching liquid.

2. The exhaust unit of claim 1, wherein the filtering section has a dirty air chamber, the dirty air chamber opening from the wetting chamber, and including one or more air filters through which the airflow path is defined.

3. The exhaust unit of claim 2, wherein the filtering section has a clean air chamber, the clean air chamber opening from the dirty air chamber through one or more openings over which the air filters are supported, and opening to the clean air output opening.

4. An exhaust unit, comprising:
 a quenching section, the quenching section having a wetting chamber, the wetting chamber opening to a dirty air intake opening, and including a reservoir having a fill level for a quenching liquid, a downtube connected over the dirty air intake opening and opening at its end above, and in opposition to, the plane of the fill level, and upright perimeter walls surrounding the downtube;
 a filtering section, the filtering section having a dirty air chamber and a clean air chamber, the dirty air chamber opening from the wetting chamber through an opening defined at the top of one of the wetting chamber's perimeter walls, and including one or more air filters, and the clean air chamber opening from the dirty air chamber through one or more openings over which the air filters are supported, and opening to a clean air output opening;
 a blower operable to induce airflow between the dirty air intake opening and the clean air output opening;
 a motor operable to power the blower;
 an air sensor located between the dirty air intake opening and the clean air output opening and configured to generate signals indicating, when the reservoir holds a quenching liquid at the fill level, the air's velocity as it flows out the end of the downtube and is directed at the surface of the quenching liquid; and
 a computing device in communication with the motor and the air sensor, the computing device configured to control the operating speed of the motor in response to the signals to maintain the air's velocity as it flows out the end of the downtube and is directed at the surface of the quenching liquid at a setpoint velocity, wherein the setpoint velocity is a velocity where, if the air is dirty air containing swept up particles, at least some of the swept up particles fall from the dirty air and land in the quenching liquid.

5. The exhaust unit of claim 4, wherein:
 when the reservoir holds a quenching liquid at the fill level, and airflow is induced between the dirty air intake opening and the clean air output opening, air took in at the dirty air intake opening flows through the inside of the downtube, is directed at the surface of the quenching liquid as it flows out the end of the downtube, and is redirected away from the surface of the quenching liquid and between the outside of the downtube and the perimeter walls.

6. The exhaust unit of claim 4, further comprising:
 a fill line, the fill line adapted to connect to a quenching liquid source, and opening to the wetting chamber in communication with the reservoir;
 a fill valve included on the fill line, the fill valve selectively actuable to open or close the fill line;
 a fill level sensor configured to generate signals indicating the level of a quenching liquid held by the reservoir; and
 a computing device in communication with the fill valve and the fill level sensor, the computing device configured to control the actuation of the fill valve in response to the signals to maintain the level of the quenching liquid held by the reservoir at the fill level.

7. The exhaust unit of claim 4, wherein the wetting chamber has a base and a roof, the reservoir is included at the bottom of the wetting chamber, and the dirty air intake opening opens from the roof.

8. The exhaust unit of claim 4, wherein the cross section of the inside of the downtube is expanded along a section leading to its end compared to the cross section of the inside of the remainder of the downtube leading from where it connects over the dirty air intake opening, whereby when the reservoir holds a quenching liquid at the fill level, the air's velocity as it flows through the inside of the remainder of the downtube is relatively higher than the air's velocity as it flows out the end of the downtube and is directed at the surface of the quenching liquid.

9. The exhaust unit of claim 1, wherein:
the wetting chamber has upright perimeter walls surrounding the downtube; and
when the reservoir holds a quenching liquid at the fill level, and airflow is induced along the airflow path, air took in at the dirty air intake opening flows through the inside of the downtube, is directed at the surface of the quenching liquid as it flows out the end of the downtube, and is redirected away from the surface of the quenching liquid and between the outside of the downtube and the perimeter walls.

10. The exhaust unit of claim 1, further comprising:
a fill line, the fill line adapted to connect to a quenching liquid source, and opening to the wetting chamber in communication with the reservoir;
a fill valve included on the fill line, the fill valve selectively actuable to open or close the fill line; and
a fill level sensor configured to generate signals indicating the level of a quenching liquid held by the reservoir;
wherein the computing device is in communication with the fill valve and the fill level sensor, and the computing device is configured to control the actuation of the fill valve in response to the signals to maintain the level of the quenching liquid held by the reservoir at the fill level.

11. The exhaust unit of claim 1, wherein the wetting chamber has upright perimeter walls surrounding the downtube, a base and a roof, the reservoir is included at the bottom of the wetting chamber, the dirty air intake opening opens from the roof, and an opening is defined at the top of one of the perimeter walls through which the airflow path is defined between the wetting chamber and the filtering section.

12. The exhaust unit of claim 1, wherein the cross section of the inside of the downtube is expanded along a section leading to its end compared to the cross section of the inside of the remainder of the downtube leading from where it connects over the dirty air intake opening, whereby when the reservoir holds a quenching liquid at the fill level, the air's velocity as it flows through the inside of the remainder of the downtube is relatively higher than the air's velocity as it flows out the end of the downtube and is directed at the surface of the quenching liquid.

13. The exhaust unit of claim 1, wherein:
the filtering section has a dirty air chamber, the dirty air chamber opening from the wetting chamber, and including one or more air filters through which the airflow path is defined; and
the filtering section has a clean air chamber, the clean air chamber opening from the dirty air chamber through one or more openings over which the air filters are supported, and opening to the clean air output opening.

* * * * *